(12) United States Patent
Hsu

(10) Patent No.: US 9,436,330 B2
(45) Date of Patent: Sep. 6, 2016

(54) TOUCH DISPLAY MODULE, ELECTRONIC DEVICE USING THE TOUCH DISPLAY MODULE AND METHOD OF ASSEMBLING THEREOF

(71) Applicant: Wistron Corp., New Taipei (TW)

(72) Inventor: Shih-Min Hsu, New Taipei (TW)

(73) Assignee: WISTRON CORP., New Taipei (TW)

( * ) Notice: Subject to any disclaimer, the term of this patent is extended or adjusted under 35 U.S.C. 154(b) by 111 days.

(21) Appl. No.: 14/334,951

(22) Filed: Jul. 18, 2014

(65) Prior Publication Data
US 2015/0261345 A1 Sep. 17, 2015

(30) Foreign Application Priority Data
Mar. 12, 2014 (TW) .............................. 103108761 A

(51) Int. Cl.
*G06F 3/044* (2006.01)
*G06F 3/041* (2006.01)
*G06F 1/18* (2006.01)

(52) U.S. Cl.
CPC ............... *G06F 3/044* (2013.01); *G06F 1/181* (2013.01); *G06F 1/183* (2013.01); *G06F 2203/04103* (2013.01)

(58) Field of Classification Search
CPC ...... G06F 3/044; G06F 3/018; G06F 1/0181; G06F 1/183; G06F 2203/04103
See application file for complete search history.

(56) References Cited

U.S. PATENT DOCUMENTS

| 2005/0129892 A1* | 6/2005 | Beyer | A47L 23/266 428/40.1 |
| 2013/0206332 A1* | 8/2013 | Jiang | C09J 7/0232 156/249 |
| 2015/0070827 A1* | 3/2015 | Hsiao | G06F 1/1643 361/679.27 |
| 2015/0173226 A1* | 6/2015 | Murakami | G06F 1/1601 428/192 |

* cited by examiner

*Primary Examiner* — Lixi C Simpson
(74) *Attorney, Agent, or Firm* — Maschoff Brennan

(57) ABSTRACT

An electronic device includes case and touch display module. The case has assembling groove, groove jointed surface and groove side surface. The touch display module disposed on the case has touch panel, adhesive element and positioning element. The touch panel located at the assembling groove has panel jointed surface and panel side surface. The panel jointed surface faces the groove jointed surface. The panel side surface faces the groove side surface. The adhesive element has two surfaces opposite to each other. The positioning element has auxiliary section and extended section. The auxiliary section is attached to one of the adhesive surface. The extended section extends from the adhesive surface and can be detachably clamped between the panel side surface and the groove side surface, which makes the gap between the groove side surface and the panel side surface is the same as the thickness of the extended section.

19 Claims, 12 Drawing Sheets

TOUCH DISPLAY MODULE, ELECTRONIC DEVICE USING THE TOUCH DISPLAY MODULE AND METHOD OF ASSEMBLING THEREOF

CROSS-REFERENCE TO RELATED APPLICATIONS

This non-provisional application claims priority under 35 U.S.C. §119(a) on Patent Application No(s). 103108761 filed in Taiwan, R.O.C. on Mar. 12, 2014, the entire contents of which are hereby incorporated by reference.

BACKGROUND

1. Technical Field

The disclosure relates to a touch display module and an electronic device using the touch display module, more particularly to a touch display module and an electronic device using the display module assembled by an adhesive method.

2. Related Art

With the development of the technology, many electronic devices are invented and are widely used in our life. So far many kinds of touch electronic devices have been launched, such as smartphones or tablet computers. Take the tablet computer for example. It commonly uses capacitative touch technique which is characterized by the direct interaction of the users and the tablet computer such as a program activated by touching the screen directly. Therefore, this operation brings abundant convenience to the people.

In general, a tablet computer comprises a case and a touch panel. The touch panel is attached to the case by a tape to reduce the thickness. Specifically, although thinning the thickness is the advantage of the tape, the stickiness results in inconvenience when a technician has to reattach the tape because of the imperfect gap between the case and the touch panel. Consequently, it is important to improve the accuracy of the position calibration and decrease the probability of reattachment for the purpose of increasing the efficiency of assembling a tablet computer.

SUMMARY

The disclosure provides an electronic device comprising a case and a touch display module. The case has an assembling groove with at least one side having a groove jointed surface and a groove side surface which are adjacent to each other. The touch display is disposed on the case includes a touch panel, an adhesive element and a positioning element. The touch panel is located at the assembling groove. At least one side of the touch panel has a panel jointed surface and a panel side surface adjacent to each other. The panel jointed surface faces the groove jointed surface, and the panel side surface faces the groove side surface. The adhesive element has a first adhesive surface and a second adhesive surface opposite to each other. The first adhesive surface is operably attached to the panel jointed surface, and the second adhesive surface is operably attached to the groove jointed surface. The positioning element has an auxiliary section and an extended section connected to each other. The auxiliary section is operably attached to the second adhesive surface. The extended section extends from the second adhesive surface and is configured to be detachably clamped between the panel side surface and the groove side surface so that the gap between the groove side surface and the panel side surface substantially the same as the thickness of the extended section.

The disclosure provides a touch display module comprising a touch panel, an adhesive element, a release element, and a positioning element. At least one side of the touch panel has a panel jointed surface. The adhesive element has a first adhesive surface and a second adhesive surface opposite to each other. The first adhesive surface is operably attached to the panel jointed surface. The release element is operably attached to the second adhesive surface of the adhesive element. The positioning element has an auxiliary section and an extended section connected to each other. The auxiliary section is operably attached to the second adhesive surface. The extended section extends from the edge of the second adhesive surface.

The disclosure provides a method for assembling electronic device. The method comprises steps of: providing a case having an assembling groove, a groove jointed surface and a groove side surface, while the groove jointed surface and the groove side surface are adjacent to each other and are located in at least one side of the assembling groove; providing a touch display module including at least a touch panel, wherein at least one side of the touch panel has a panel jointed surface and a panel side surface adjacent to each other; providing an adhesive element and a release element, wherein the adhesive element has a first adhesive surface and a second adhesive surface opposite to each other, the first adhesive surface is operably attached to the panel jointed surface, the release element is operably attached to the second adhesive surface and has a notch configured to expose partial second adhesive surface; providing an positioning element having an auxiliary section and an extended section connected to each other, wherein the auxiliary section is located in the notch of the release element and is attached to partial the second adhesive surface and the extended section extends from the edge of the second adhesive surface; and, removing at least the extended section of the positioning element.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1A:
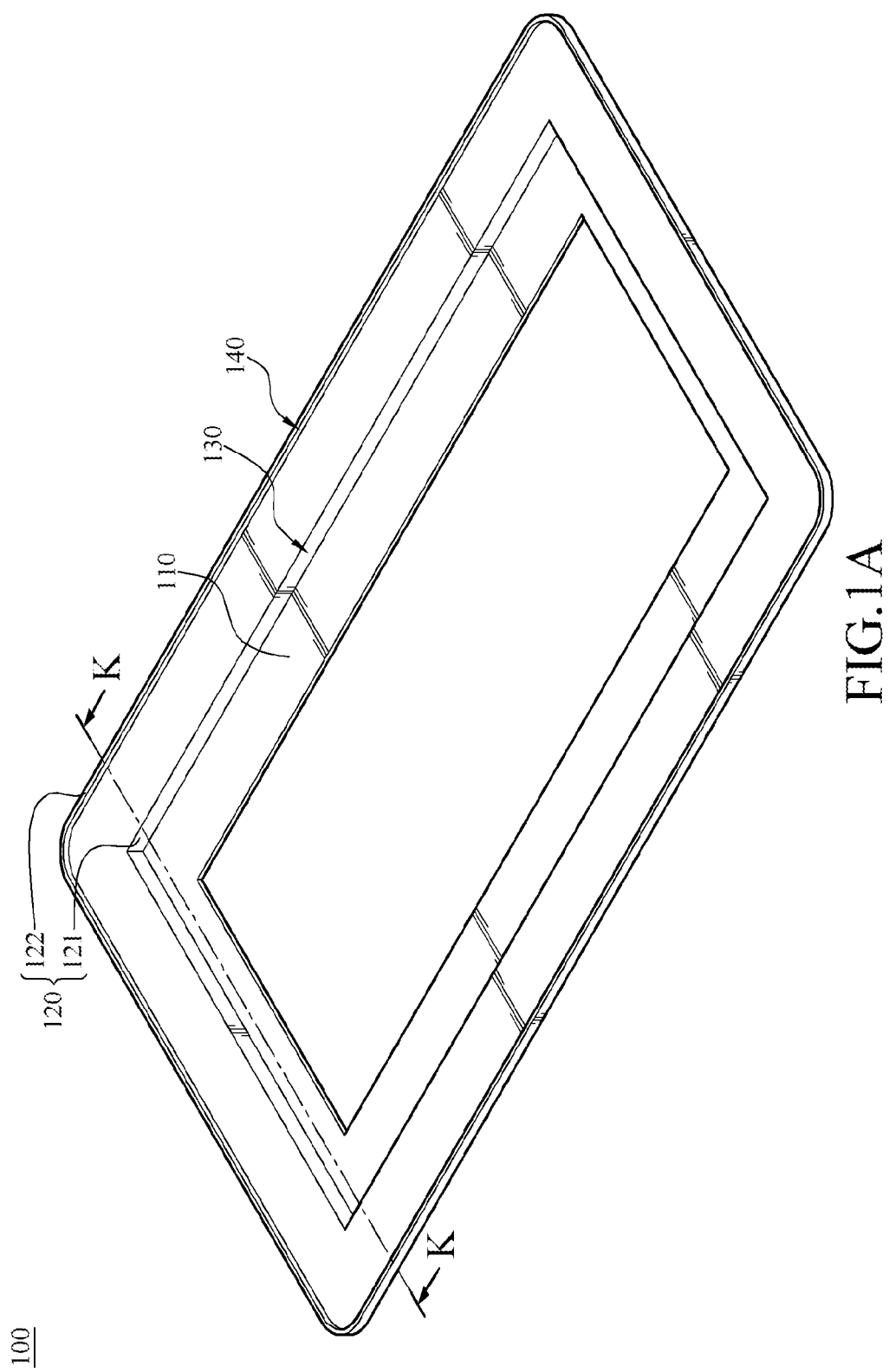
FIG. 1A is a perspective view of a case of an electronic device according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
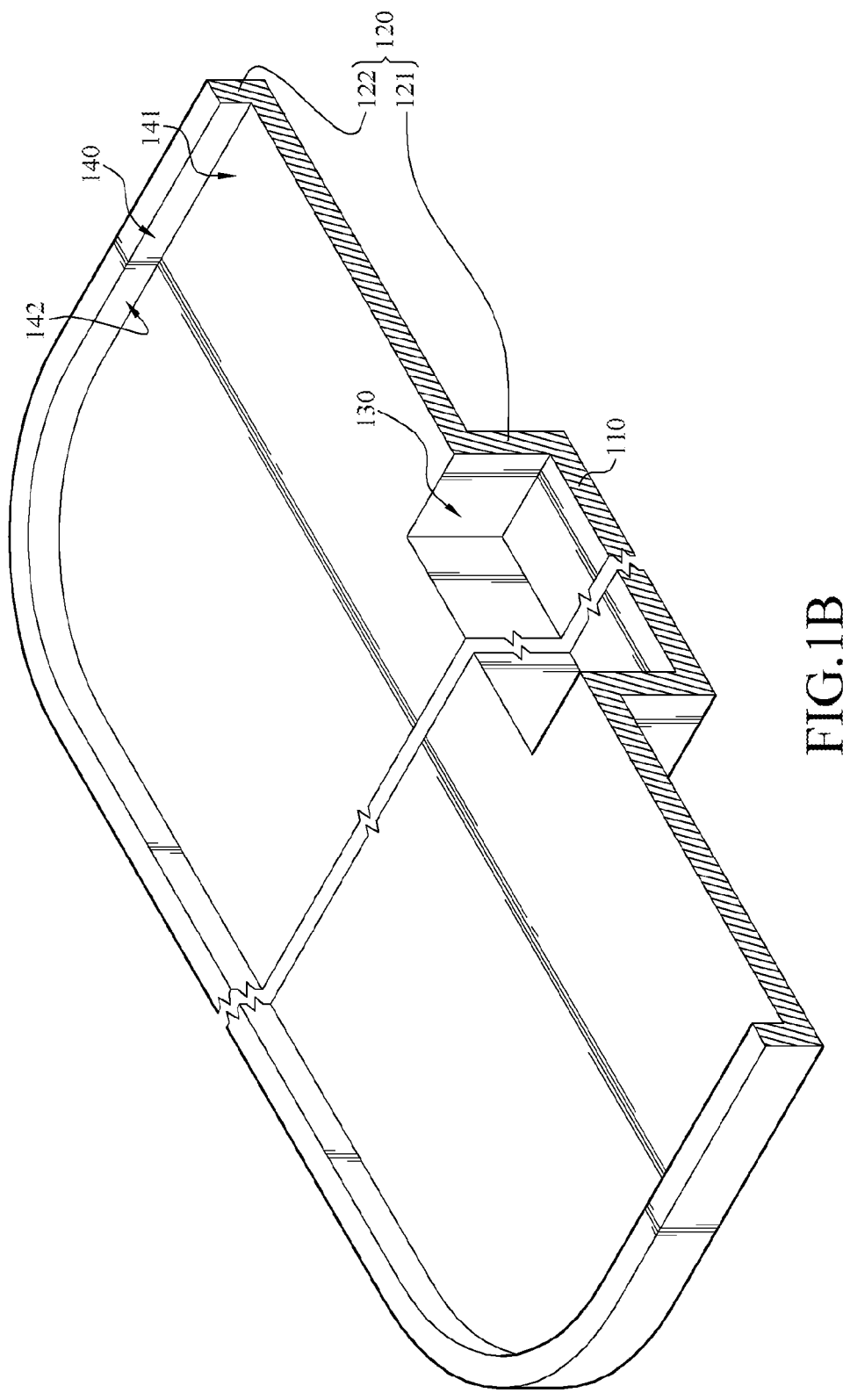
FIG. 1B is a cross-sectional view of FIG. 1A.
Figure 2A:
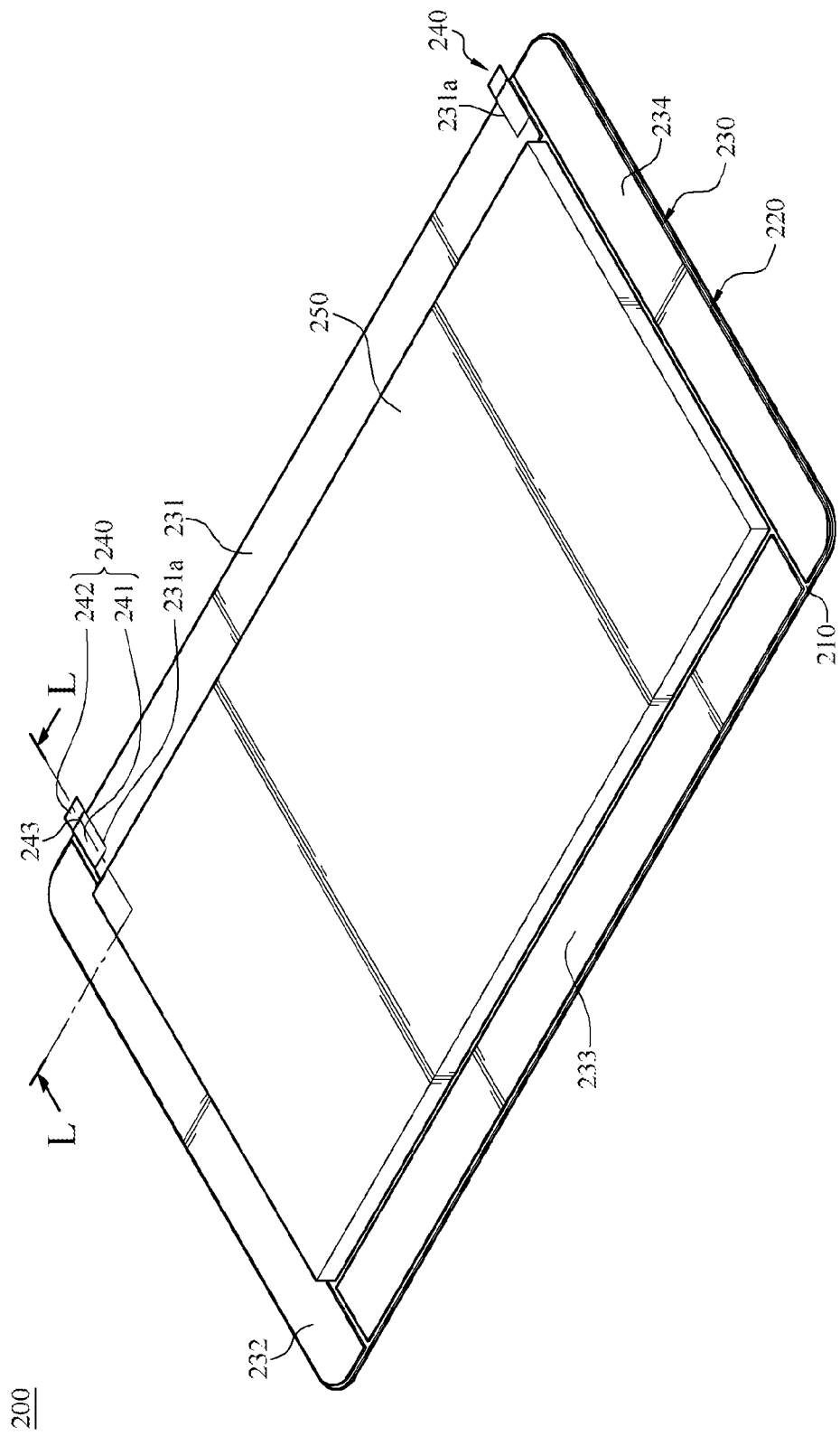
FIG. 2A is a perspective view of a touch display module according to the first embodiment.
Figure 2B:
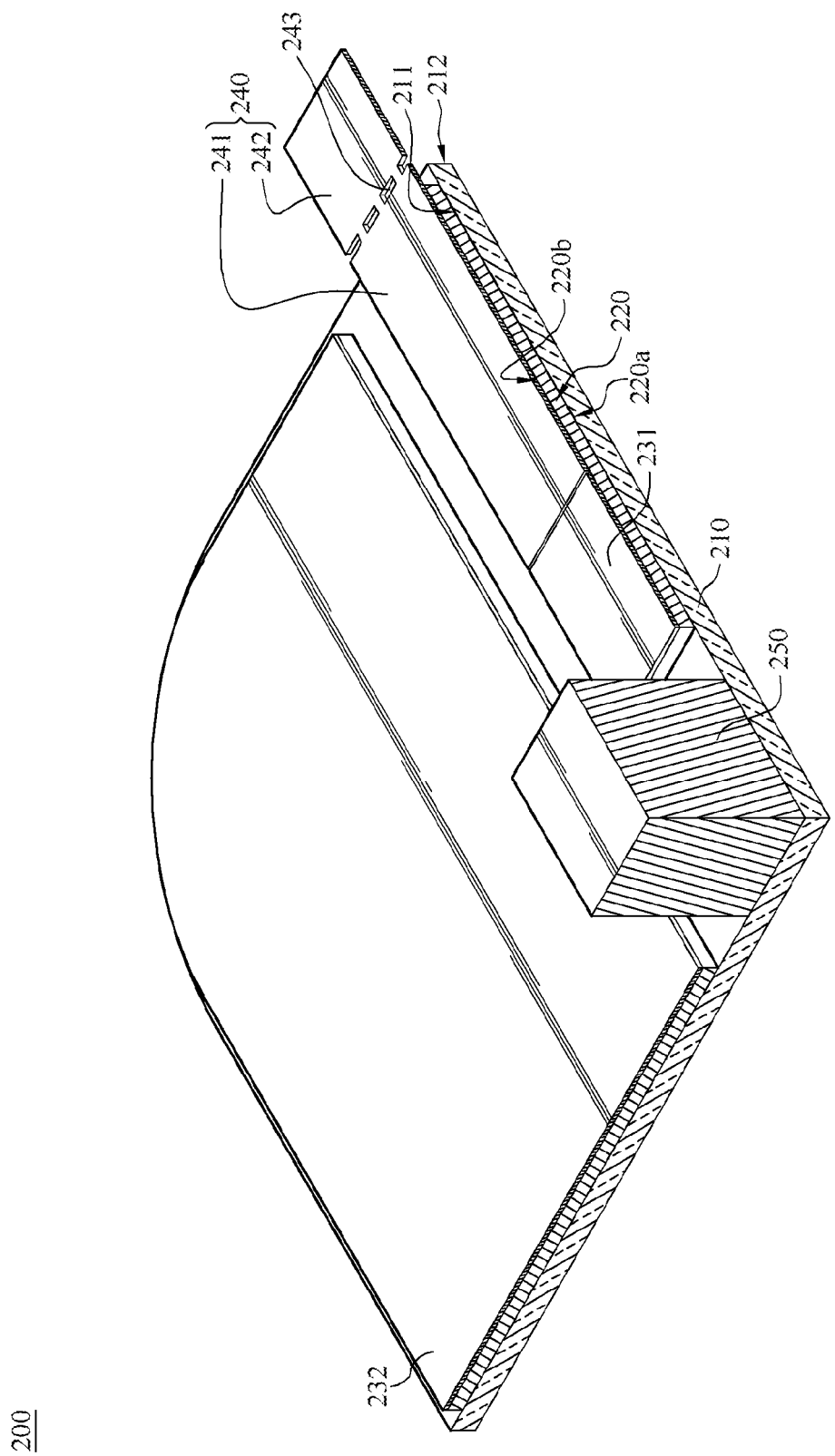
FIG. 2B is a cross-sectional view of FIG. 2A.

FIG. 1A is a perspective view of a case of an electronic device according to a first embodiment. FIG. 1B is a cross-sectional view of FIG. 1A along K-K dotted line. FIG. 2A is a perspective view of a touch display module according to the first embodiment. FIG. 2B is a cross-sectional view of FIG. 2A along L-L dotted line. The scale of the elements is not limited thereto.

The disclosure provides a method for assembling an electronic device 10. The electronic device 10, for example, is a cell phone or a tablet having a touch function. First, a case 100 and a touch display module 200 are provided. However, the order of providing the case 100 and the touch display module 200 is not limited thereto.

As shown in FIG. 1A and FIG. 1B, the case 100 comprises a bottom plate 110 and a plurality of side plates 120. Each one of the side plates 120 has a first wall 121 and a second wall 122. The distance of two of the first walls 121 opposite to each other is less than that of two of the second walls 122 opposite to each other. The first walls 121 and the bottom plate 100 together form an accommodated space 130, the second walls 122 enclose an assembling groove 140. The case 100 has a groove jointed surface 141 and a groove side surface 142 connected to each other to form the assembling groove 140. The first wall 121 is connected to the bottom plate 110 and the groove jointed surface 141, and the groove jointed surface 141 is connected to the second wall 122.

As shown in FIG. 2A and FIG. 2B, the touch display module 200 comprises a touch panel 210, an adhesive element 220, a release element 230, an positioning element 240 and a screen 250. The touch panel 210 has a panel jointed surface 211 and a panel side surface 212. The panel side surface 212 is connected to the panel jointed surface 211.

Figure 3:
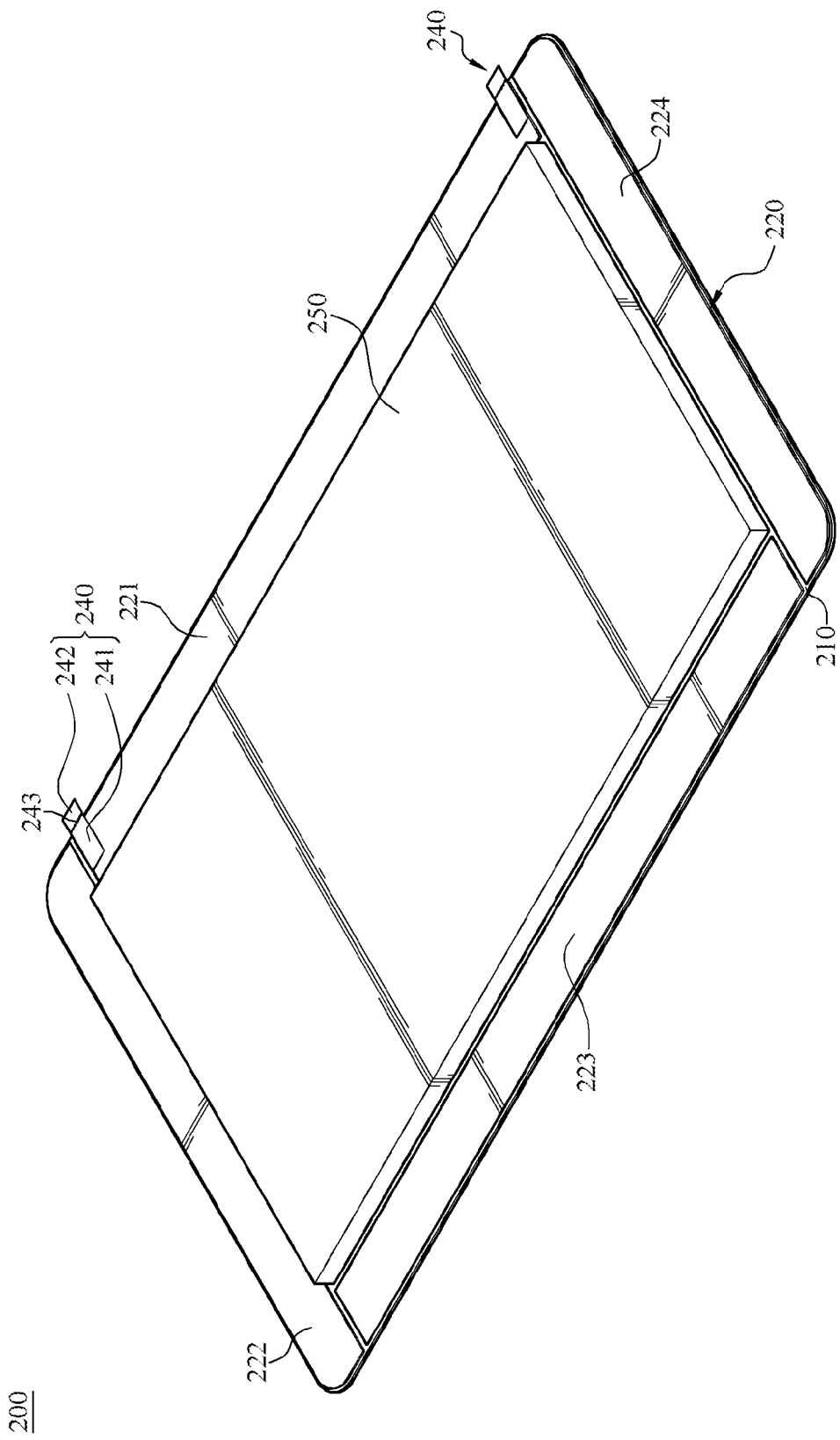
FIG. 3 is a perspective view of a touch display module after a release element is removed according to the first embodiment.

The adhesive element 220 is, for example, a twin adhesive tape or a double sided foam tape. The adhesive element 220 has a first adhesive surface 220a and a second adhesive surface 220b opposite to each other. The first adhesive surface 220a is operably attached to the panel jointed surface 211. FIG. 3 is a perspective view of the touch display module after the release element is removed according to the first embodiment. The adhesive 220 is annular and has a first adhesive component 221, a second adhesive component 222, a third adhesive component 223 and a forth adhesive 224 component which are adjacent to each other and are operably attached to the panel jointed surface 211.

The release element 230 has at least a surface with releasing treatment. The surface with releasing treatment is operably attached to the adhesive element 220 so that users are able to tear off the release element 230 from the adhesive element 220. In detail, the release element 230 comprises a first attaching component 231, a second attaching component 232, a third attaching component 233 and a forth attaching component 244 detachably attached to the first adhesive component 221, the second adhesive component 222, the third adhesive component 223 and the forth adhesive component 224. In this embodiment, the first attaching component 231 has two notches 231a, but the disclosure is not limited thereto. In other embodiments, the notches 231a are capable of being located at the first attaching component 231 and the second attaching component 232 simultaneously.

In this embodiment, the first attaching component 231, the second attaching component 232, the third attaching component 233 and the forth attaching component 244 are divided by a release paper but do not limited thereto. In other embodiments, the attaching elements 231-234 are integrally formed.

The positioning element 240 has an auxiliary section 241 and an extended section 242 connected to each other. The auxiliary section 241 is operably attached to the second adhesive surface 220b of the adhesive element 220 and is located at the notch 231a so as to be adjacent to and be coplanar with the first attaching component 231 of the release element 230. The extended section 242 extends from the edge of the second adhesive surface 220a of the adhesive element 220. The linked part of the auxiliary section 241 and the extended section 242 has a plurality of stamp holes 243 so that the users are able to tear off the extended section 242 from the auxiliary section 241 conveniently. In this embodiment, the length of the auxiliary section 241 is longer than that of the extended section 242 in the direction from the auxiliary section 241 to the extended section 242.

In this embodiment, a material of the positioning element 240 is the same as the material of the release element 230, which means the positioning element 240 and the release element 230 are divided by a same release paper, but is the disclosure is not limited thereto. In other embodiments, the material of the positioning element 240 is different from the material of the release element 230. That is, the positioning element 240 is not a release paper.

The screen 250, for example, is a liquid crystal module located at the accommodated space 130 of the case 100 to display images. In this embodiment, the touch display module 200 is a semi-manufactured product where the adhesive element 220, the release element 230 and the positioning element 240 are operably attached, but the disclosure is not limited thereto. In other embodiments, the touch panel 210 where the adhesive element 220, the release element 230 and the positioning element 240 are not attached is provided only. The adhesive element 220, the release element 230 and the positioning element 240 are configured to be attached to the touch panel 210 thereafter.

Figure 4:
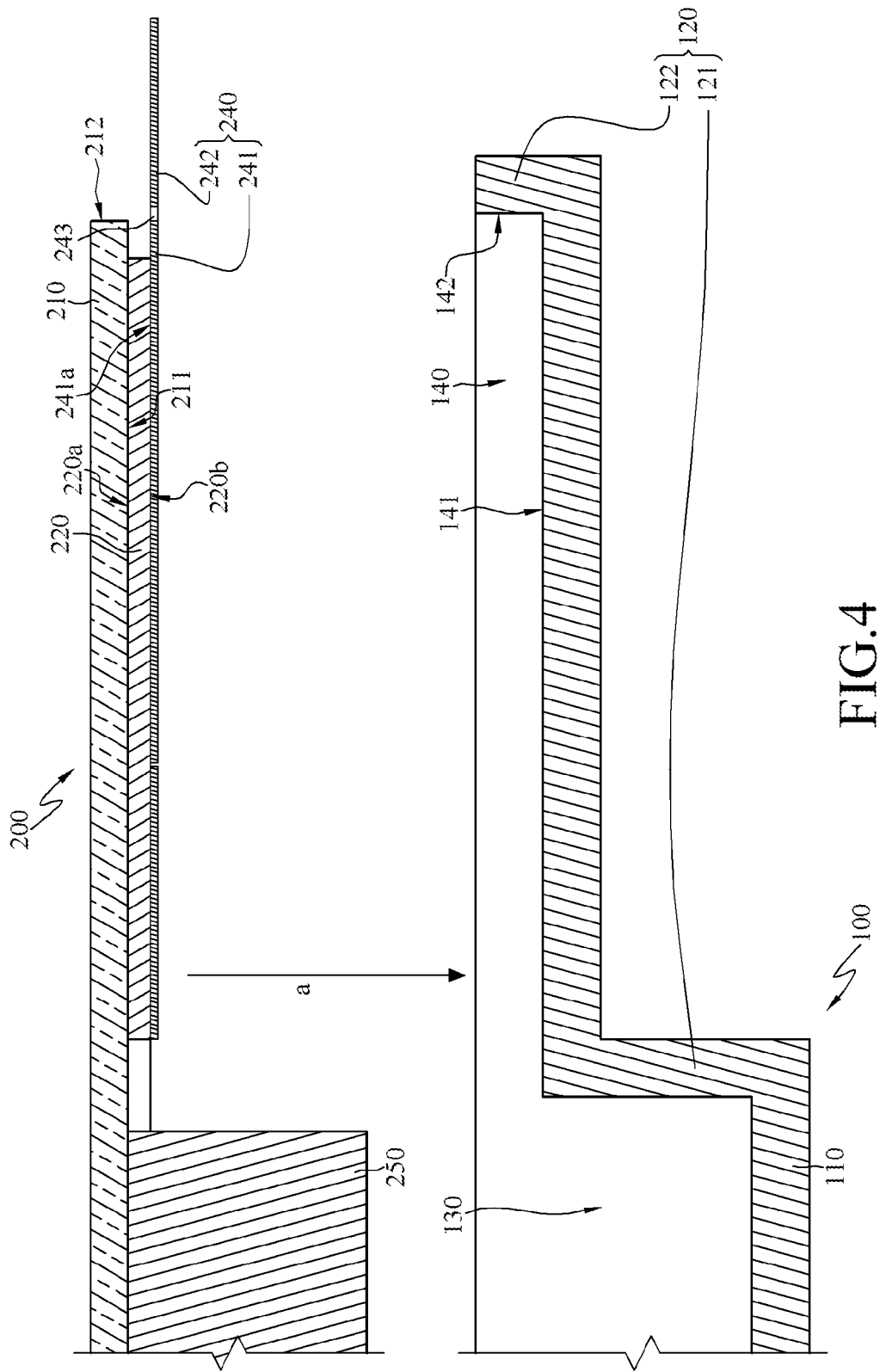
FIG. 4 to FIG. 6 are assembling drawings of the electronic device according to the first embodiment.
Figure 5:
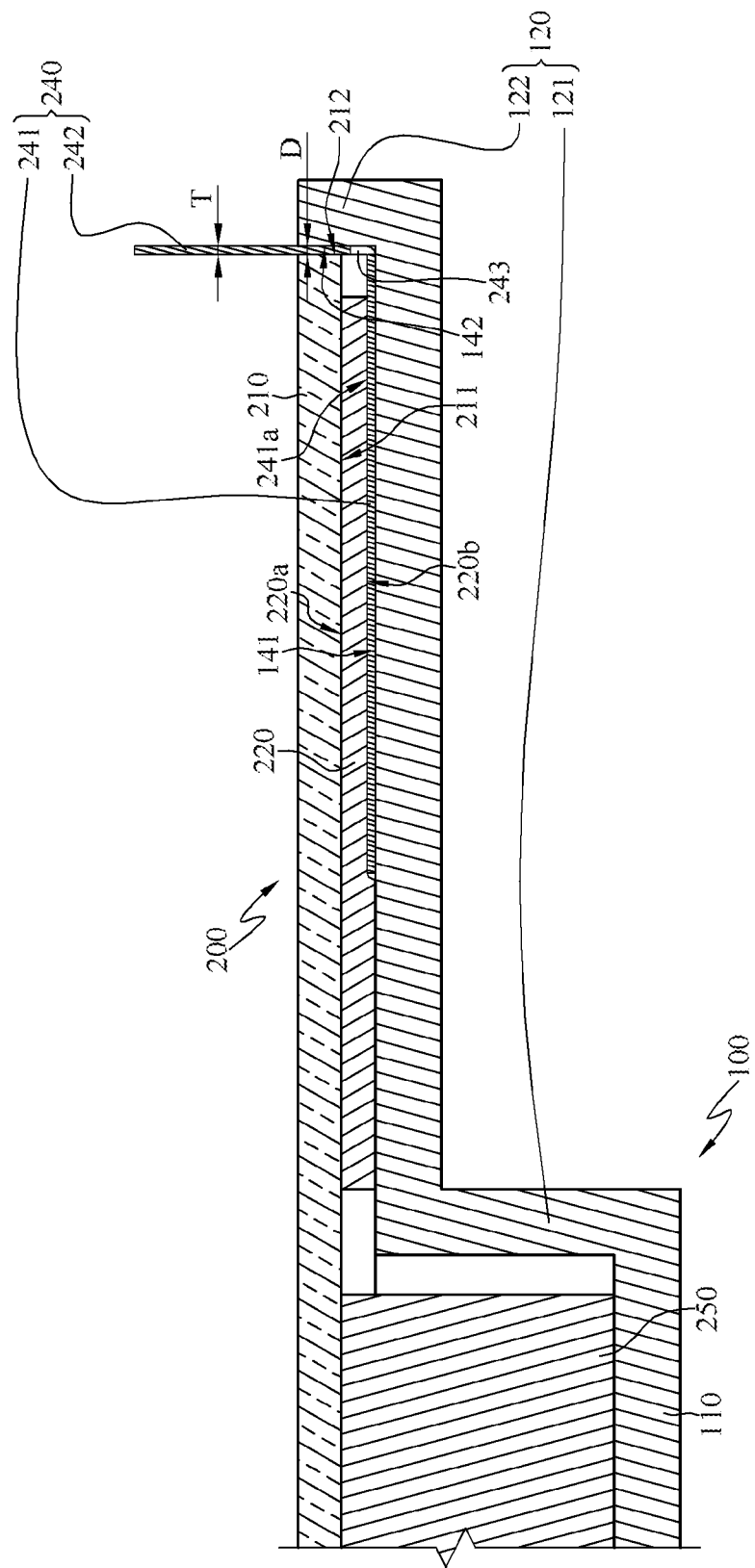
Figure 6:
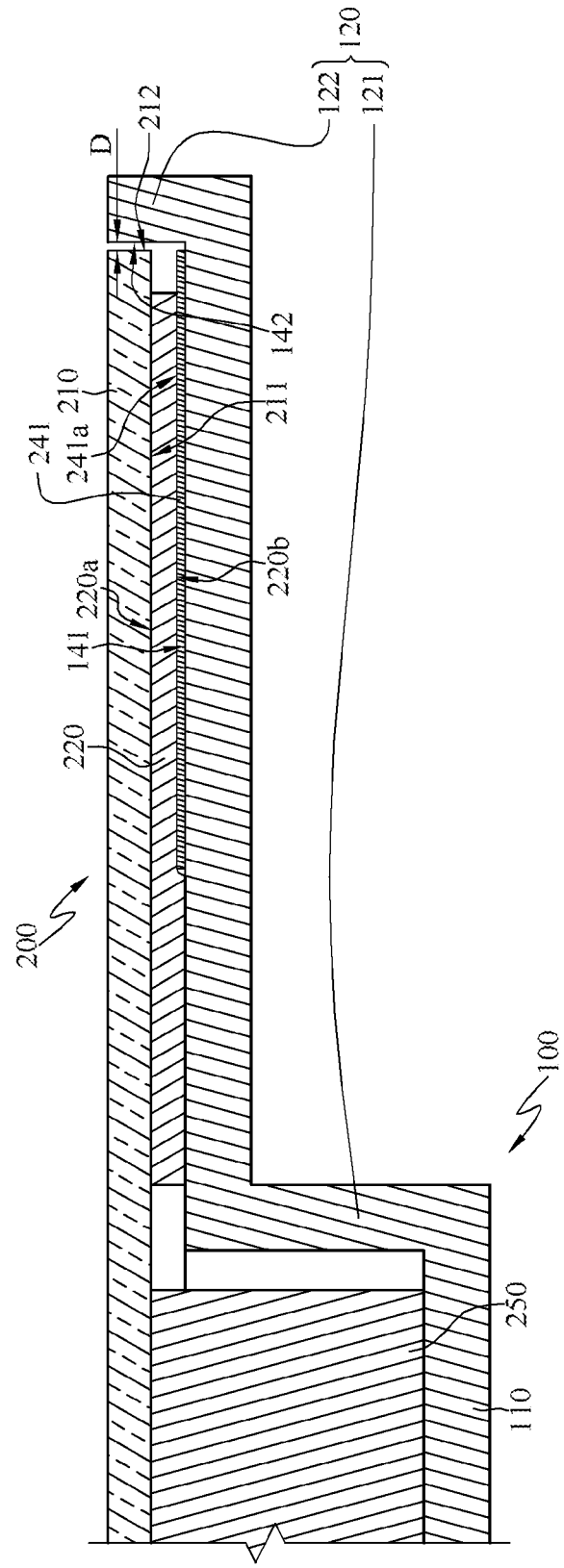

FIG. 4 to FIG. 6 are a plurality of assembling drawings of the electronic device according to the first embodiment.

As shown in FIG. 3, the first the release element 230 (the first attaching component 231, the second attaching component 232, the third attaching component 233 and the forth attaching component 244) is initially removed to expose the second adhesive surface 220b of the adhesive element 220. In this process, the positioning element 240 is not connected to the release element 230 so as to be attached to the second adhesive surface 220b instead of being removed with the release element 230. In the next step, the touch display module 200 is reversed to be disposed on the case 100 shown in FIG. 1A. As shown in FIG. 4, the touch panel 210 is disposed on the assembling groove 140 (along the direction pointed by an arrow a) to make the second adhesive surface 220b faces the groove jointed surface 141 and the panel side surface 212 faces the groove side surface 142.

As shown in FIG. 5, in the next step the second adhesive surface 220b is operably attached to the groove jointed surface 141 to make the extended section 242 be clamped between the panel side surface 212 and the groove side surface 142. A gap D between the panel side surface 212 and the groove side surface 142 is the same as a thickness T of the extended section 242. When technicians execute this step, a side of the touch panel 210 attaching the positioning element 240 is horizontally abutted on the groove side surface 142. The touch panel 210 is pressed to assembly with the case 100 after the touch panel 210 and the case 100 are successfully calibrated, or the assembling and the calibration mentioned before are also configured to be executed simultaneously. Therefore, the technicians is able to calibrate the touch panel 210 and the case 100 accurately in a rapid way due to the assistance of the extended section 242 (using the thickness of the extended section 242 to control the gap between the panel side surface 212 and the groove side surface 142), thereby increasing the efficiency of assembling a tablet computer. Moreover, partial extended section 242 is exposed outside so that the extended section 242 is removed more conveniently after the touch panel 210 is assembled with the case 100.

As shown in FIG. 6, in the next step the extended section 242 is removed from the positioning element 240. The linked part of the auxiliary section 241 and the extended section 242 has the stamp holes 243 so that the extended section 242 is removed only when pulling the extended section 242 exposed outside. The auxiliary section 241 is left between the adhesive element 220 and the case 100. The auxiliary section 241 occupies few ratio of the region between the touch panel 210 and the case 100 so that the stickiness of the touch panel 210 and the case 100 is not influenced, and the reliabilities of the touch panel 210 and the case 100 are not influenced even though the auxiliary section 241 is left. Furthermore, the thickness of the auxiliary section 241 is extremely thin and the adhesive element 220 has compressibility so that the auxiliary section 241 does not incline the touch panel 210.

Figure 7:
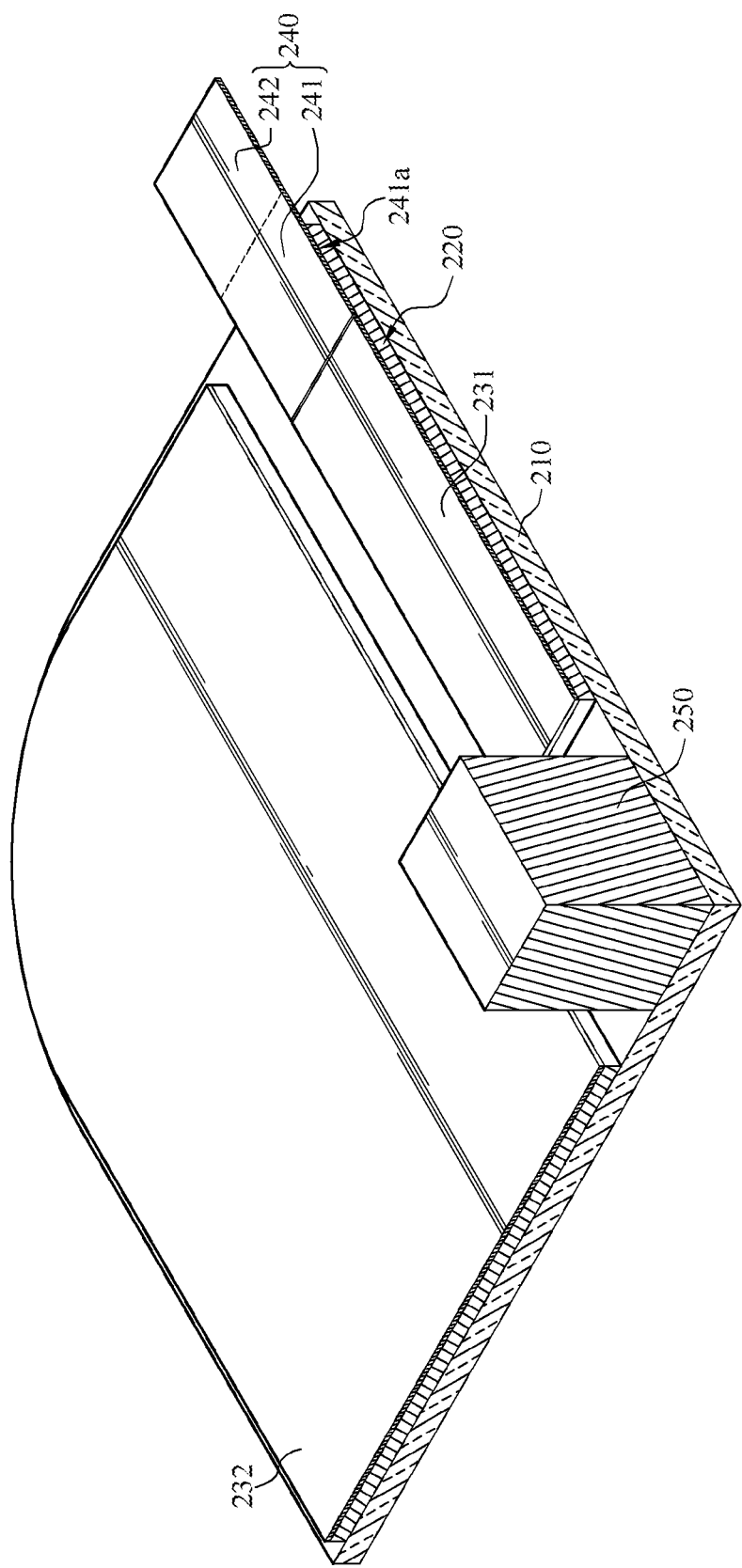
FIG. 7 is a perspective view of a touch display module according to a second embodiment.

FIG. 7 is a perspective view of a touch display module according to a second embodiment. The following statement just explains the different characteristics from the first embodiment.

The following describes the difference of structure. In the second embodiment, an auxiliary section 241 has a release surface 241a. The length of the auxiliary section 241 in this embodiment is shorter than that of the auxiliary section 241 in the first embodiment. The length of the auxiliary section 241 is the same as or shorter than that of an extended section 242 in the direction from the auxiliary section 241 to the extended section 242. The release surface 241a is operably attached to a second adhesive surface 220b of an adhesive element 220. Partial second adhesive surface 220b which is not covered by the auxiliary section 241 is operably attached to a groove jointed surface 141 of a case 100.

Moreover, in this embodiment, the linked part of the auxiliary section 241 and the extended section 242 has no stamp holes 243 shown in the first embodiment.

Figure 8:
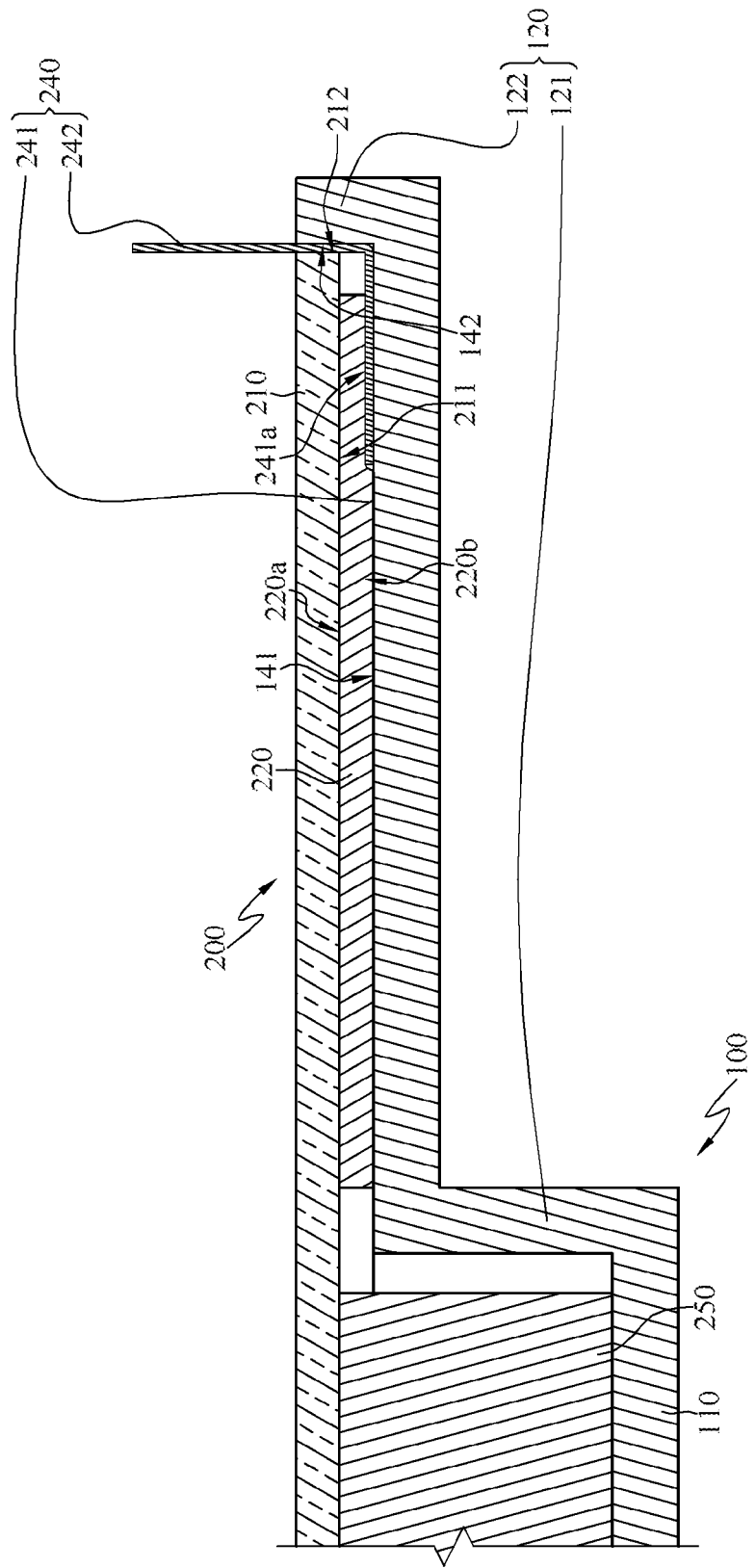
FIG. 8 is a cross-sectional view of the touch display module attached to a case according to the second embodiment.
Figure 9:
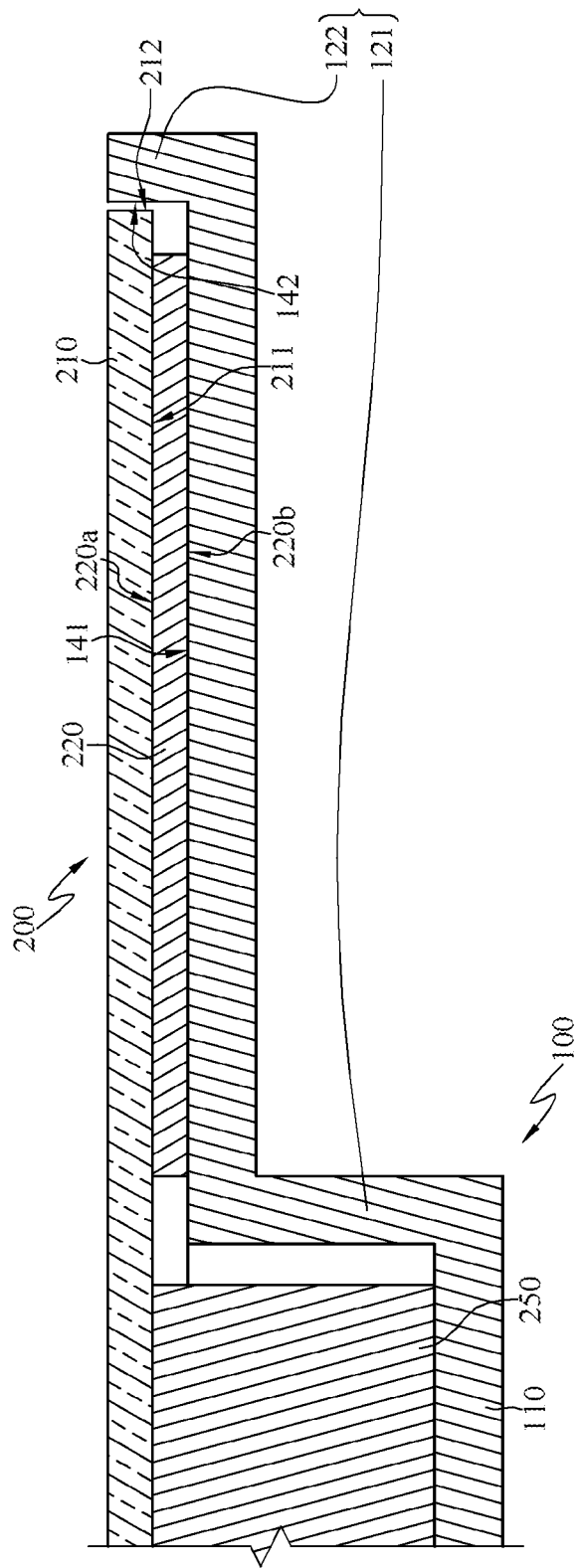
FIG. 9 is a cross-sectional view of removing an auxiliary section in FIG. 8.

The differences between the assembling steps are described. FIG. 8 is a cross-sectional view of the touch display module attached to a case according to the second embodiment. FIG. 9 is a cross-sectional view of removing an auxiliary section in FIG. 8.

As shown in FIG. 8, the auxiliary section 241 is clamped between the second adhesive surface 220b and the groove jointed surface 141 in the step of attaching the second adhesive surface 220b to the groove jointed surface 141. The extended section 242 is clamped between a panel side surface 212 and a groove side surface 142.

As shown in FIG. 9, the linked part of the auxiliary section 241 and the extended section 242 has no stamp holes 243, and the length of the auxiliary section 241 between the touch panel 210 and the case 100 is shorter so that the friction is smaller. Therefore, the auxiliary section 241 is removed with the extended section 242 in the step of removing the extended section 242 of the positioning element 240.

Figure 10:
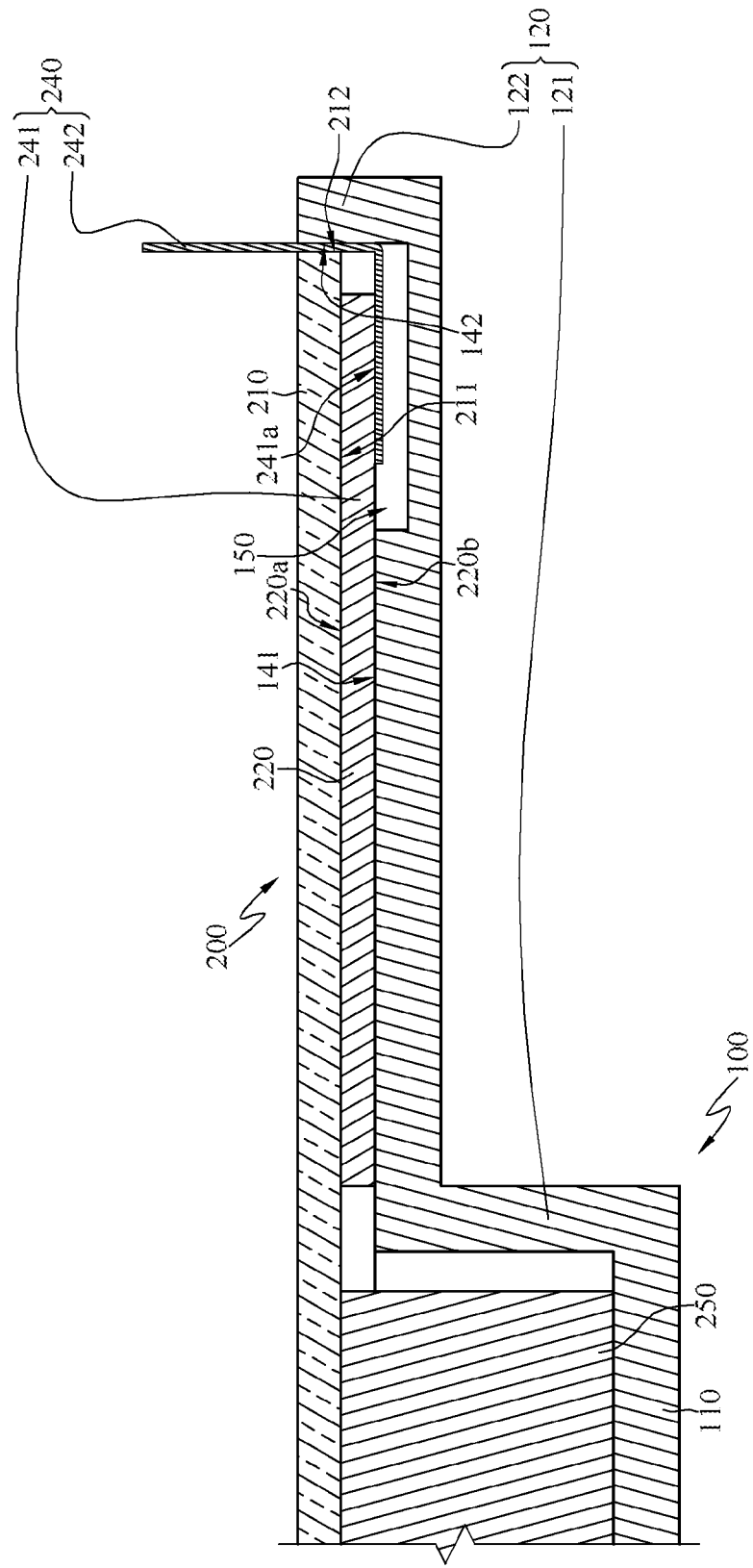
FIG. 10 is a cross-sectional view of an electronic device before an extended section is removed according to a third embodiment.

FIG. 10 is a cross-sectional view of an electronic device before an extended section is removed according to a third embodiment. To remove an auxiliary section 241 by pulling an extended section 242 without a plurality of stamp holes 243, a case 100 further has a trench 150. The trench 150 is located at a groove jointed surface 141 corresponding to the auxiliary section 241. When a touch panel 210 is operably attached to the case 100, the auxiliary section 241 of an positioning element 240 is located in the trench 150 and does not contact a bottom surface of the trench 150 so that the technicians are able to remove both the auxiliary section 241 and the extended section 242.

According to the disclosure providing a touch display module, an electronic device using the touch display module and a method for assembling the electronic device, an extended section is clamped between a panel side surface of a touch panel and a groove side surface of a case. The relative position of the touch panel and the case is able to be accurately calibrated in a rapid way by the thickness of the extended section. Therefore, the accuracy of the position calibration is improved and the probability of reattachment is reduced to increase the efficiency of assembling a tablet computer. Moreover, the linked part of an auxiliary section and the extended section has a plurality of stamp holes so that the users tear off the extended section from the auxiliary section conveniently. A trench is located corresponding to the auxiliary section to make the auxiliary section the extended section are removed simultaneously.

What is claimed is:

1. An electronic device, comprising:
a case, having an assembling groove with at least one side having a groove jointed surface and a groove side surface which are adjacent to each other; and
a touch display module disposed on the case, comprising:
a touch panel disposed in the assembling groove, with at least one side of the touch panel having a panel jointed surface and a panel side surface which are adjacent to each other, wherein the panel jointed surface faces the groove jointed surface, and the panel side surface faces the groove side surface;
an adhesive element having a first adhesive surface and a second adhesive surface which are opposite to each other, wherein the first adhesive surface is operably attached to the panel jointed surface, and the second adhesive surface is operably attached to the groove jointed surface; and
a positioning element having an auxiliary section and an extended section which are connected to each other, wherein the auxiliary section is operably attached to the second adhesive surface, the extended section extends from the second adhesive surface and is configured to be detachably clamped between the panel side surface and the groove side surface when the touch panel is disposed in the assembling groove so that a gap between the groove side surface and the panel side surface substantially the same as the thickness of the extended section.

2. The electronic device according to claim 1, wherein a length of the auxiliary section is longer than that of the extended section in the direction from the auxiliary section to the extended section.

3. The electronic device according to claim 1, wherein a linked part of the auxiliary section and the extended section has a plurality of stamp holes.

4. The electronic device according to claim 1, wherein the length of the auxiliary section is the same as or shorter than the length of the extended section in the direction from the auxiliary section to the extended section.

5. The electronic device according to claim 4, wherein the case has a trench located at the groove jointed surface with respect to the auxiliary section, and a bottom surface of the trench does not contact the auxiliary section.

6. The electronic device according to claim 1, wherein the touch display module further comprises a screen, the case comprises a bottom plate and a plurality of side plates, the side plates are connected to the bottom plate, the touch panel is disposed on the side plates, and the screen is located between the bottom plate and the touch panel.

7. The electronic device according to claim 6, wherein each of the side plates has a first wall and a second wall, the first wall is connected to the bottom plate and the groove jointed surface, the groove jointed surface is connected to the second wall, a distance of two of the first walls opposite to each other is less than that of two of the second walls opposite to each other, the first walls and the bottom plate together form an accommodated space, the second walls enclose the assembling groove, and the screen is located at the accommodated space.

8. A touch display module, comprising:
  a touch panel with at least one side having a panel jointed surface;
  an adhesive element having a first adhesive surface and a second adhesive surface opposite to each other, wherein the first adhesive surface is operably attached to the panel jointed surface;
  a release element operably attached to the second adhesive surface of the adhesive element; and
  a positioning element having an auxiliary section and an extended section connected to each other, wherein the auxiliary section is operably attached to the second adhesive surface, and the extended section extends from an edge of the second adhesive surface.

9. The touch display module according to claim 8, wherein the release element has a notch and the auxiliary section is located at the notch.

10. The touch display module according to claim 8, wherein the panel jointed surface surrounds the touch panel; the adhesive element has a first adhesive component, a second adhesive component, a third adhesive component and a forth adhesive component which are operably attached to the panel jointed surface, and the release element comprises a first attaching component, a second attaching component, a third attaching component and a forth attaching component which are detachably attached to the first adhesive component, the second adhesive component, the third adhesive component and the forth adhesive component, respectively.

11. The touch display module according to claim 8, wherein a linked part of the auxiliary section and the extended section has a plurality of stamp holes.

12. The touch display module according to claim 8, wherein the length of the auxiliary section is longer than the length of the extended section in the direction from the auxiliary section to the extended section.

13. The touch display module according to claim 8, wherein the length of the auxiliary section is the same as or shorter than the length of the extended section in the direction from the auxiliary section to the extended section.

14. A method for assembling electronic device, comprising steps of:
  providing a case having an assembling groove, a groove jointed surface and a groove side surface; wherein the groove jointed surface and the groove side surface are adjacent to each other and are located in at least one side of the assembling groove;
  providing a touch display module including at least a touch panel, wherein at least one side of the touch panel has a panel jointed surface and a panel side surface adjacent to each other;
  providing an adhesive element and a release element, wherein the adhesive element has a first adhesive surface and a second adhesive surface opposite to each other, wherein the first adhesive surface is operably attached to the panel jointed surface, the release element is operably attached to the second adhesive surface and has a notch configured to expose partial second adhesive surface;
  providing an positioning element having an auxiliary section and an extended section connected to each other, wherein the auxiliary section is located in the notch of the release element and is operably attached to partial the second adhesive surface; the extended section extends from the edge of the second adhesive surface;
  removing the release element to expose the second adhesive surface of the adhesive element;
  disposing the touch panel on the assembling groove of the case to make the second adhesive surface faces the groove jointed surface and the panel side surface faces the groove side surface;
  attaching the second adhesive surface of the adhesive element to the groove jointed surface of the case, wherein the extended section is clamped between the panel side surface and the groove side surface, which makes the gap between the groove side surface and the panel side surface substantially the same as the thickness of the extended section; and
  removing at least the extended section of the positioning element.

15. The method for assembling electronic device according to claim 14, wherein the extended section and the auxiliary section are removed simultaneously in the step of removing at least the extended section of the positioning element.

16. The method for assembling electronic device according to claim 15, wherein the auxiliary section has a release surface attached to the adhesive element.

17. The method for assembling electronic device according to claim 16, wherein the case has a trench located at the groove jointed surface with respect to the auxiliary section, the bottom of the trench does not contact the auxiliary section.

18. The method for assembling electronic device according to claim 14, wherein the extended section is removed while the auxiliary section is not removed in the step of removing at least the extended section of the positioning element.

19. The method for assembling electronic device according to claim 18, wherein a linked part of the auxiliary section and the extended section has a plurality of stamp holes.

* * * * *